US010570989B2

(12) United States Patent
Hornung et al.

(10) Patent No.: US 10,570,989 B2
(45) Date of Patent: Feb. 25, 2020

(54) MANUALLY OPERATED BALANCING WEIGHT DISPENSER

(71) Applicant: Wegmann automotive GmbH, Veitshöchheim (DE)

(72) Inventors: Thomas Hornung, Würzburg (DE); Michael Lutz, Würzburg (DE)

(73) Assignee: WEGMANN AUTOMOTIVE GMBH, Veitshöchheim (DE)

( * ) Notice: Subject to any disclaimer, the term of this patent is extended or adjusted under 35 U.S.C. 154(b) by 0 days.

(21) Appl. No.: 15/205,201

(22) Filed: Jul. 8, 2016

(65) Prior Publication Data

US 2016/0319904 A1 Nov. 3, 2016

Related U.S. Application Data

(63) Continuation of application No. PCT/EP2014/079461, filed on Dec. 30, 2014.

(30) Foreign Application Priority Data

Jan. 8, 2014 (EP) .................................... 14150502

(51) Int. Cl.
*F16F 15/32* (2006.01)
*B65H 35/06* (2006.01)
(Continued)

(52) U.S. Cl.
CPC .......... *F16F 15/328* (2013.01); *B65H 35/06* (2013.01); *G01M 1/326* (2013.01); *G01M 1/02* (2013.01)

(58) Field of Classification Search
CPC ...... F16F 15/328; G01M 1/326; B65H 35/06; B65H 35/026; B65H 35/006;
(Continued)

(56) References Cited

U.S. PATENT DOCUMENTS 2,221,213 A * 11/1940 Borden .................. B43M 11/00
225/25
2,290,223 A * 7/1942 Black .................... B65H 35/002
83/397
(Continued)

FOREIGN PATENT DOCUMENTS

EP 1245318 A1 10/2002
EP 1253414 A2 * 10/2002 .............. G01M 1/02
(Continued)

OTHER PUBLICATIONS

Steel Wheel Weights, published on Jun. 8, 2013, avaiable, on Aug. 16, 2017, at Http://wwww.bendpack.com/Wheel-Weights/.*
(Continued)

*Primary Examiner* — Jonathan G Riley
(74) *Attorney, Agent, or Firm* — Norton Rose Fulbright US LLP

(57) ABSTRACT

A balancing weight dispenser has a balancing weight storage space for storing a belt of balancing weights on a reel, a belt guide, and a cutter at one end of and/or along a length of the belt guide. The cutter comprises a knife, which is fixedly attached to the balancing weight dispenser. For delivery of a required amount of balancing weight mass, the belt of balancing weights is pulled from the reel until the desired number of balancing weights has been obtained. In the next step, the belt of balancing weights is cut, preferably between two adjacent balancing weights, to separate the selected portion of balancing weights from the remaining belt of balancing weights. The remaining belt falls back to the guide and remains in a desired position for receiving the next portion of balancing weights. This manually operated balancing weight dispenser can be provided at significantly lower costs compared to the automated high performance (Continued)

balancing weight dispensers as known from the prior art. It is very robust and has no serviceable parts.

22 Claims, 8 Drawing Sheets

(51) Int. Cl.
   *G01M 1/32* (2006.01)
   *G01M 1/02* (2006.01)
(58) Field of Classification Search
   CPC ............... B65H 35/0026; Y10S 83/922; Y10T 225/211; Y10T 83/4503; Y10T 83/6644
   See application file for complete search history.

(56) References Cited

U.S. PATENT DOCUMENTS

| | | | | |
|---|---|---|---|---|
| 2,305,592 A * | 12/1942 | Anderson | ........ | B65H 35/0026 188/85 |
| 2,309,093 A * | 1/1943 | Borden | ............ | B65H 35/0046 156/465 |
| 2,663,369 A * | 12/1953 | Erhardt | ............ | B65H 35/0026 225/20 |
| 3,007,619 A * | 11/1961 | Burcz | ................ | B65H 35/0026 225/19 |
| 3,477,624 A * | 11/1969 | Harshbarger | ...... | B65D 83/0841 206/395 |
| 3,508,692 A * | 4/1970 | Holtan | ............... | B65H 35/0026 225/33 |
| 3,521,800 A * | 7/1970 | Stephens | ............ | B65H 35/0026 225/21 |
| 3,635,473 A * | 1/1972 | Sasaki | .................... | B26D 1/025 225/19 |
| 3,679,110 A * | 7/1972 | Stine | .................... | B65D 85/672 225/47 |
| 3,696,980 A * | 10/1972 | Waltz | ................ | B65H 35/0026 225/66 |
| 3,725,182 A * | 4/1973 | Regan | ............... | B65H 35/0026 156/517 |
| 3,960,409 A * | 6/1976 | Songer | ................. | F16F 15/328 301/5.21 |
| 3,991,923 A * | 11/1976 | Nishikawa | ......... | B65H 35/0026 225/20 |
| 4,059,210 A * | 11/1977 | Deering, Jr. | ....... | B65H 35/0026 225/47 |
| 5,221,033 A * | 6/1993 | Klein | .................... | A61C 7/306 206/63.5 |
| 5,363,997 A * | 11/1994 | Harris | ................ | B65H 35/0026 225/25 |
| 5,678,689 A * | 10/1997 | Clark | ................. | B65H 35/0033 206/408 |
| 5,768,968 A * | 6/1998 | Park | ....................... | B26D 1/045 83/418 |
| 6,364,421 B1 * | 4/2002 | Pursley | ................. | F16F 15/328 301/5.21 |
| 7,931,342 B2 | 4/2011 | Spaulding et al. | ............ | 73/470 |
| 2002/0135223 A1 * | 9/2002 | Gross | .................... | F16F 15/328 301/5.21 |
| 2005/0104438 A1 * | 5/2005 | Petchel | ................. | F16F 15/328 301/5.21 |
| 2009/0308965 A1 * | 12/2009 | Piucci | ...................... | B26D 5/20 242/526 |
| 2015/0008278 A1 * | 1/2015 | Bode | .................... | F16F 15/324 242/562 |
| 2017/0050813 A1 * | 2/2017 | Vogler | ............... | B65D 83/0472 |

FOREIGN PATENT DOCUMENTS

| | | | |
|---|---|---|---|
| EP | 1318326 A1 | 6/2003 | |
| EP | 2103560 A2 | 9/2009 | |
| JP | S39-020595 | 7/1964 | |
| JP | 2002-013592 | 1/2002 | |
| WO | WO/07/081843 A1 | 7/2007 | |
| WO | WO 2007134788 A1 * | 11/2007 | ............ F16F 15/328 |

OTHER PUBLICATIONS

Extended European Search Report in European Application No. 14150502.4 dated Jun. 27, 2014.
Response to Extended European Search Report in European Application No. 14150502.4 dated Oct. 20, 2014.
First Office Action in European Application No. 14150502.4 dated Mar. 6, 2015.
Response to Communication pursuant to Art. 94(3) EPC in European Application No. 14150502.4 filed Apr. 28, 2015.
Second Office Action in European Application No. 14150502.4 dated May 27, 2016.
Response to Communication pursuant to Art. 94(3) EPC in European Application No. 14150502.4 filed Aug. 23, 2015.
Notice of Intent to Grant in European Application No. 14150502.4 dated Oct. 24, 2016.
International Search Report and Written Opinion in International Application No. PCT/EP2014/079461 dated Mar. 23, 2015.
Office action in Korean Application No. KR 10-2016-7021400 dated Mar. 2, 2017.

* cited by examiner

MANUALLY OPERATED BALANCING WEIGHT DISPENSER

PRIORITY CLAIM

This application is a continuation of pending International Application No. PCT/EP2014/079461 filed on Dec. 30, 2014, which designates the United States and claims priority from European Patent Application No. 14150502.4 filed on Jan. 8, 2014, each of which is incorporated herein by reference in its entirety.

BACKGROUND OF THE INVENTION

1. Field of the Invention

The invention relates to a manually operated dispensing device for balancing weights, preferably for balancing weights for vehicle wheels.

2. Description of Relevant Art

Self-adhesive balancing weights having a weight body, comprising a mass material and a self-adhesive tape for attaching the balancing weight to a rim are disclosed in EP 1 355 084 A1 and in EP 1 039 169 A1. The balancing weights are delivered in boxes, each box containing a plurality of balancing weights. The balancing weight bodies have segments, which allow cutting off or breaking off pieces of the balancing weight body, therefore reducing or modifying the mass of the balancing weight according to the required mass. These balancing weights allow simple handling and storage, although the disadvantage is that a significant amount of the mass material is wasted. If, for example, the total of mass of the balancing weight body is 60 grams, and only 25 grams are needed for balancing, then 35 grams are wasted.

U.S. Pat. No. 7,931,342 B2 and U.S. Pat. No. 6,547,338 B2 disclose adhesive wheel weight dispensing apparatus, where a cutting member is movable by a pneumatic cylinder and balancing weights. They are fed by balancing weights on a reel. There, a large number of individual balancing weights are attached to a common self-adhesive tape. This common self-adhesive tape holds the individual balancing weights together and forms a belt of balancing weights, which is cut into smaller pieces by automated cutting and handling devices. The smaller pieces of balancing weights are individually cut according to the requirements for each vehicle wheel, during the balancing process of the wheel. Therefore, such automated balancing weight dispensing machines are preferably used in automated balancing weight devices, which are often used at car or tire manufacturers. EP 1 253 414 A2 discloses a further automated dispenser with a pneumatically operated cutter.

A small tire workshop cannot afford a high performance automated balancing weight dispensing machine as described before. These machines are too expensive and require a significant amount of maintenance.

SUMMARY OF THE INVENTION

The embodiments are based on the object of providing a low cost dispenser for balancing weights, which is manually operated and which allows dispensing of balancing weights having masses individually adapted to a specific tire and/or rim and having a low waste of balancing weight material. Furthermore, the dispenser should be usable by persons without special training. It should be simple and have no or at least a very small number of serviceable parts.

In an embodiment, a manually operated balancing weight dispenser can be provided at significantly lower costs compared to the automated high performance balancing weight dispensers as known from the prior art. The balancing weight dispenser uses balancing weights where individual balancing weight bodies are attached to a common tape carrier, forming a belt of balancing weights. This balancing weight belt is stored in or on a storage space provided in or at the dispenser. Preferably, the balancing weight belt is wound on a reel. In an alternate embodiment, it may also be stored in a box where the balancing weights are stacked in separate layers. The belt of balancing weights is guided by a belt guide to provide the belt of balancing weights and therefore the balancing weights in a given position to the operator. Furthermore, a cutter is provided. It is preferably located at the end or within the belt guide.

For delivery of a required amount of balancing weight mass, the belt of balancing weights is pulled from the reel or stack until the desired number of balancing weights has been obtained. In the next step, the belt of balancing weights is cut, preferably between two adjacent balancing weights, to separate the selected portion of balancing weights from the remaining belt of balancing weights. The remaining belt is placed or falls back to the guide and remains in a desired position for receiving the next portion of balancing weights.

In a preferred embodiment, the cutter comprises a fixed knife for cutting the balancing weight belt and therefore for preferably cutting the self-adhesive tape and/or the liner. Cutting may be performed by sideward pushing the belt of balancing weights towards the cutter, whereas preferably the cutting knife is positioned between two adjacent balancing weight bodies. This ensures that the belt of balancing weights is cut at a position between two adjacent balancing weights. Preferably, the knife is fixed to the balancing weight dispenser or a support being part of the dispenser. Most preferably, the knife is not movable against balancing weight dispenser or the support.

Preferably, the cutter is a simple module, which can be exchanged, when the knife is blunt. Preferably, the cutter has a solid base plate, which holds a knife. The knife may be clamped, glued, welded, or soldered to the cutter base plate. Furthermore, it is preferred, if the cutter base plate forms a cutting slot through which the belt of balancing weights in inserted for cutting. It is preferred that this slot is wide enough for inserting the belt of balancing weights. On the other hand, it should be comparatively narrow to prevent a finger or other body part of the operator from being cut by the knife and therefore prevents injuries.

In another preferred embodiment, a guide is provided which guides the belt of balancing weights, such that the knife is located in a position between two adjacent balancing weights, and therefore avoids blocking or damaging of the knife by a balancing weight body. This guide may be a wedge-of funnel-shaped means, which guides the belt of balancing weights, which is moved towards the knife, such that the knife is automatically positioned between two adjacent balancing weight bodies.

In another embodiment, the guide may simply block pushing balancing weights at a position of a balancing weight body towards the knife and would allow pushing the belt of balancing weights at a position between two adjacent balancing weights towards the knife.

In another embodiment, at least two dispensers are arranged to a dispenser assembly. This allows delivery of at least two different kinds of balancing weights to provide for a backup with a second dispenser in case the first dispenser fails, which may be caused by an empty reel of balancing weights or by a damaged cutter.

It is furthermore preferred to have a container attached to a balancing weight dispenser, which may be used for collecting balancing weight waste, like unused balancing weights, tape pieces, or liner pieces.

In another preferred embodiment, at least one balancing weight dispenser is mounted to a stand, which holds the balancing weight dispenser in a suitable user-friendly position to allow easy access to the balancing weights.

In a preferred embodiment, the balancing weights are held on a tape carrier, which preferably is a self-adhesive tape, which is provided at one side of the balancing weight bodies for holding the balancing weight bodies to a rim. The side of the self-adhesive tape opposite to the balancing weights may be protected by a liner.

In another preferred embodiment, each balancing weight or a small number of balancing weights bear individual self-adhesive tapes, which are connected by a common tape carrier. This common tape carrier may also have the function of protecting the adhesive side of the self-adhesive tape pieces opposite to the balancing weights. It may be a liner.

In another embodiment, a movable knife is provided. This knife may be manually operated by a leaver or it may be operated by an electrical motor, an electric or pneumatic actuator. Movement of the knife may be either manually triggered by a trigger, a switch or a valve which is released by the operator. It may also be triggered by a sensor, like an optical sensor, a mechanical sensor, or a magnetic sensor. Such a sensor may detect the presence of the balancing weight belt and therefore trigger the knife to cut the belt of balancing weights. It is preferred, that triggering of the knife is only enabled if the knife is between two adjacent balancing weights.

In another embodiment, a means for moving or pushing the belt of balancing weights to or through the knife may be provided. Such a means for pushing may also be operated by a leaver, which is operated by the operator or by an electrical motor, or an electrical or pneumatic actuator. It may also be triggered automatically as described before.

In another embodiment, the cutter may be enabled to cut not only the tape, but also a balancing weight body. This would require a much more solid cutter and/or a much more solid knife. On the other hand, this would allow selecting even portions of a balancing weight, and therefore allowing for a much more precise balancing.

BRIEF DESCRIPTION OF THE DRAWINGS

In the following, the invention will be described by way of example, without limitation of the general inventive concept, on examples of embodiment and with reference to the drawings.

Figure 1:
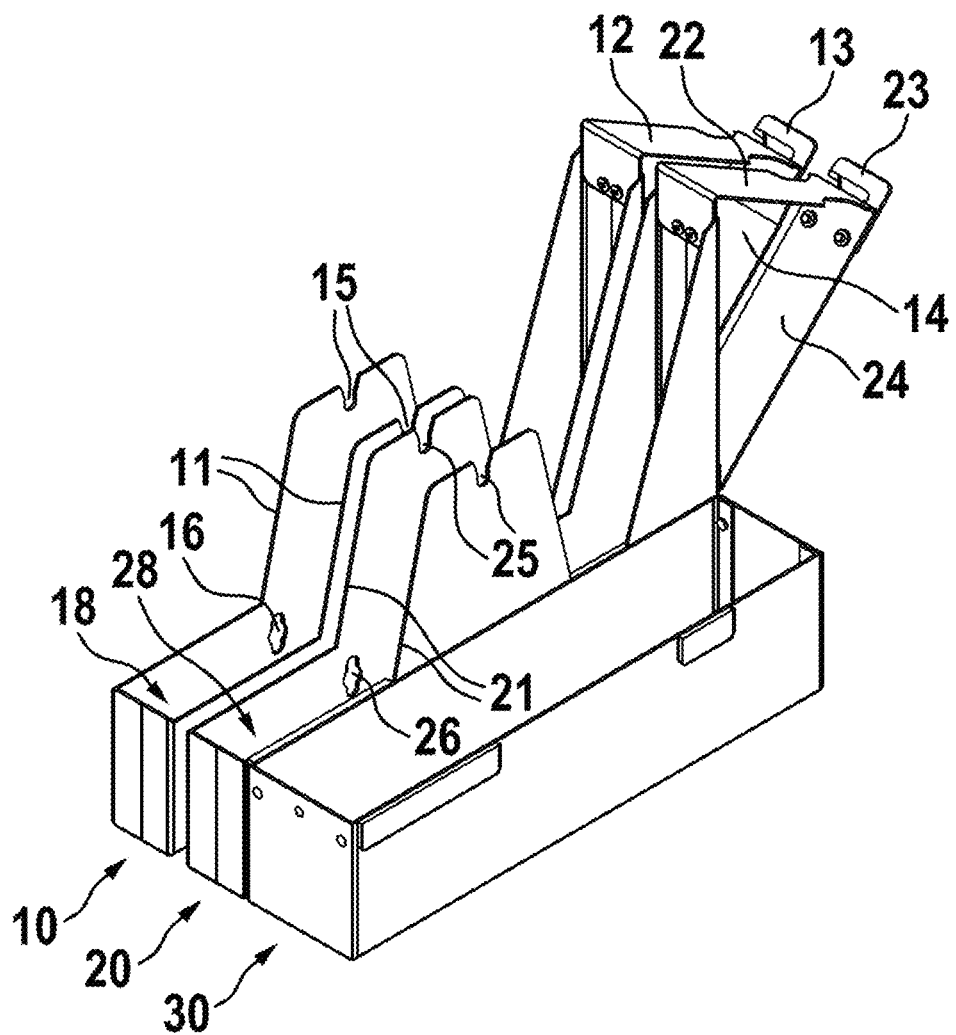
FIG. 1 shows a balancing weight dispenser assembly according to a first embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

In FIG. 1, a balancing weight dispensing apparatus according to a first embodiment is shown. A first balancing weight dispenser 10, a second balancing weight dispenser 20, and a container 30 are assembled to a first balancing weight dispenser assembly. The first balancing weight dispenser 10 is basically the same as the second balancing weight dispenser 20. Therefore, only one balancing weight dispenser is described in more detail. For holding a reel 41, as later shown, a pair of reel holders 11, 21 is provided. Preferably, each reel holder has a pivot guide slot or hole 15, 25. For guiding the belt of balancing weights, a belt guide 12, 22 is provided. Furthermore, a cutter 13, 23 is provided and preferably arranged at the end of the belt guide 12, 22. For stabilizing the belt guide and holding the cutter in place, a support 14, 24 is provided. Although the embodiment is not limited to this simple design, a part of the body of the balancing weight dispenser together with the belt guide and the support forms a stable triangle and gives a rigid support for the cutter. There is at least one mounting slot or hole 16, 26 to attach a plurality of balancing weight dispensers together and/or to attach them to a stand 50, as shown later. The body the balancing weight dispenser forms a balancing weight storage space 18, 28, which may hold a reel of balancing weights or a stack of balancing weights.

Figure 2:
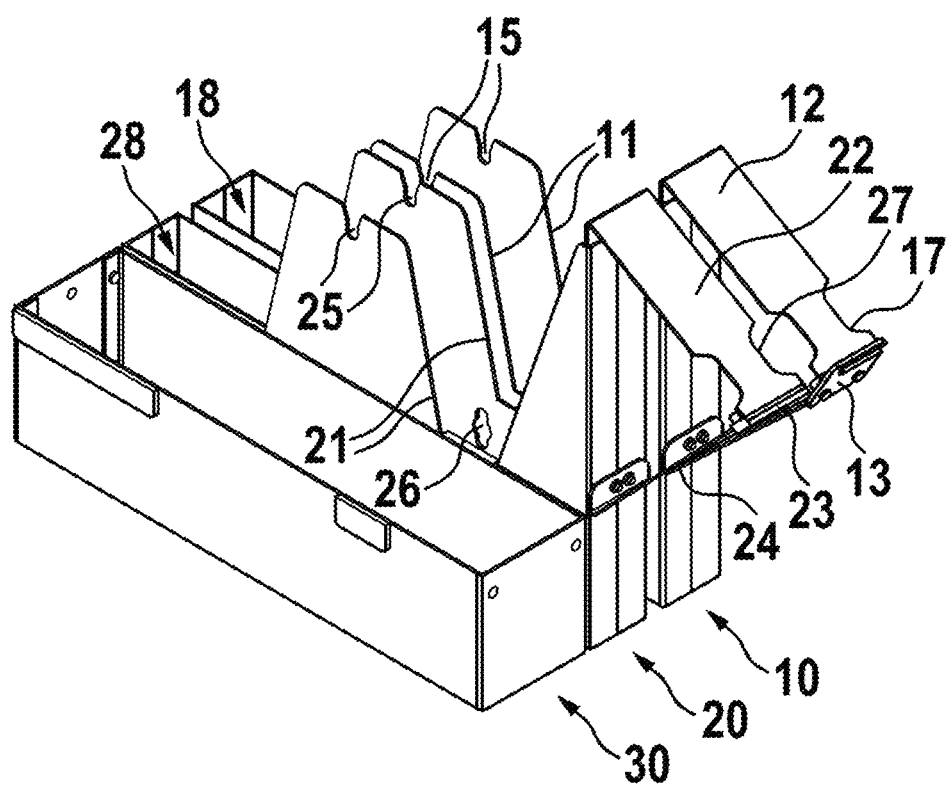
FIG. 2 shows the first embodiment in a different perspective view.

In FIG. 2, the previous embodiment is shown in a different perspective view. Here, the belt guide 12, 22 can be seen in more detail. Preferably, the belt guide has at least one recess 17, 27 which simplifies access to and quitting of the belt of balancing weights.

Figure 3:
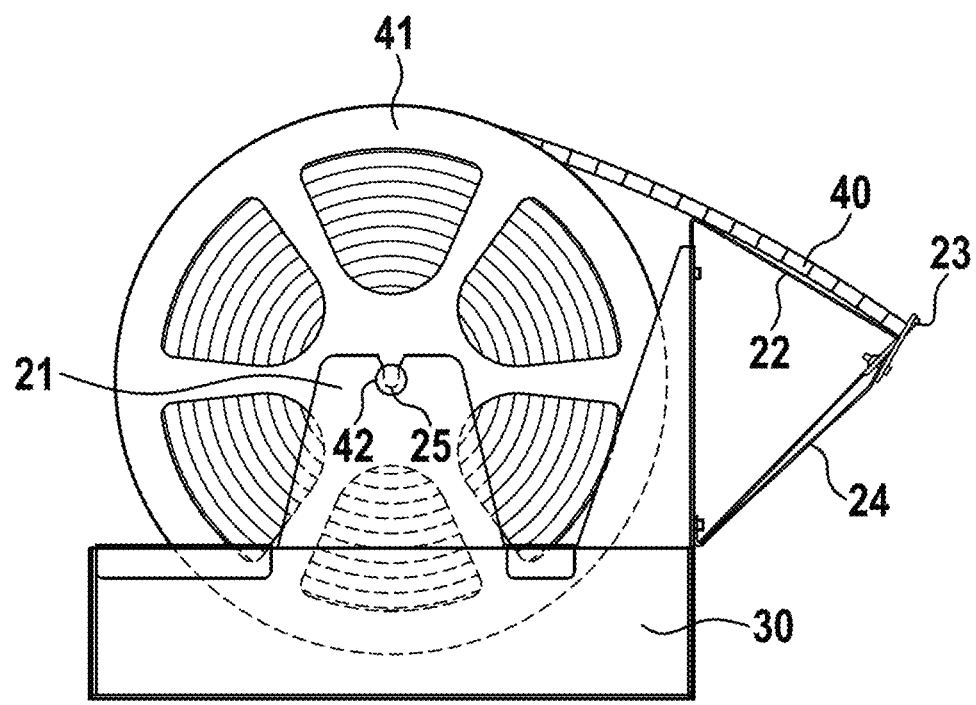
FIG. 3 shows the previous embodiment in a side view.

In FIG. 3, the previous embodiment is shown in a side view. Furthermore, a reel 41 holding a belt of balancing weights 40 is shown. In this embodiment, the reel 41 has a pivot 42, which is held by the pivot guide slots 25 in the balancing weight dispenser.

Figure 4:
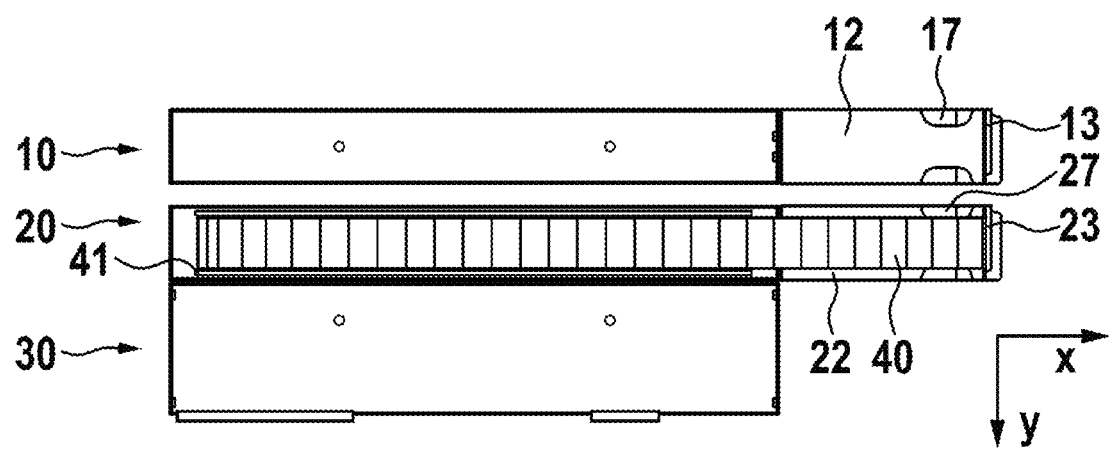
FIG. 4 shows the embodiment in a top view.

In FIG. 4, the embodiment is shown in a top view. Here, a reel 41 is only inserted into the second balancing weight dispenser 20, while the first balancing weight dispenser 10 is empty. It can be seen, how the recess 27 simplifies gripping of the balancing weights of the belt of balancing weights 40. For this purpose, the width of the belt guide 22 at a position of the recess 27 is narrower than the width of the balancing weights. For receiving a balancing weight, the belt is pulled into the direction indicated as x, which is also the direction, in which the belt of balancing weights unwinds from the reel. For cutting, the belt is inserted into the cutter between two adjacent balancing weights and moved sideward into the direction perpendicular to the first direction, here marked as y. The cutter may also be mounted in the opposite direction, so that the cutting operation may be done in the opposite direction.

Figure 5:
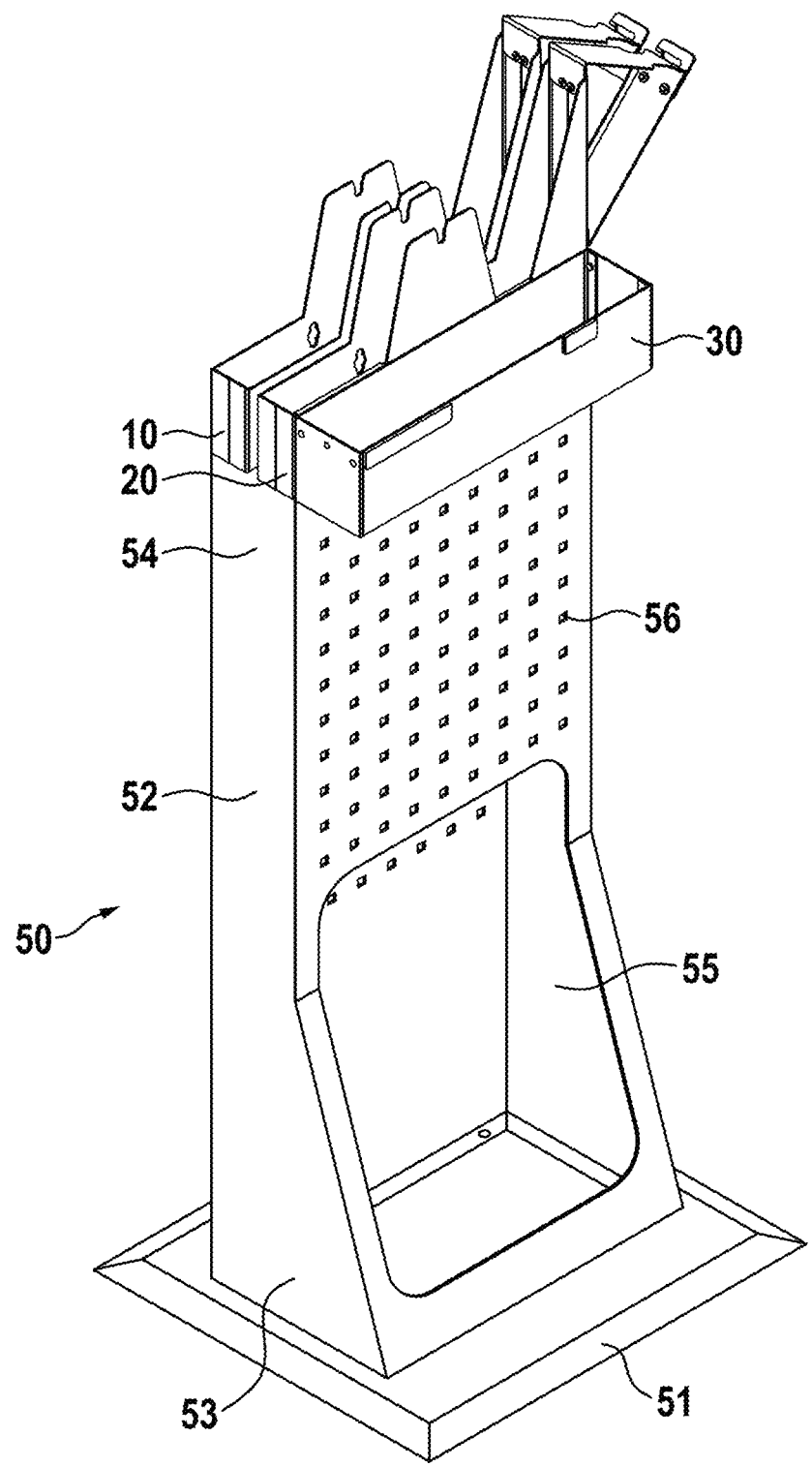
FIG. 5 shows a balancing weight dispenser assembly mounted to a stand.

In FIG. 5, a balancing weight dispenser assembly is shown mounted to a stand, which holds the balancing weight dispenser assembly in a favorable position for easy access. The stand 50 preferably has a base 51 for stabilizing the stand on a floor. The stand 50 furthermore has a body 52 with a lower section 53 and an upper section 54. Preferably, the lower section 53 has an opening 55, which may be used to hold a waste container for spare balancing weights. It is further preferred if the upper section 54 has a plurality of holes 56 which allow the insertion of pins or wires, or other devices for holding tools. Therefore, a plurality of tools, which may be used for mounting and removing of balancing weights, may be held by the upper section of the stand.

Figure 6:
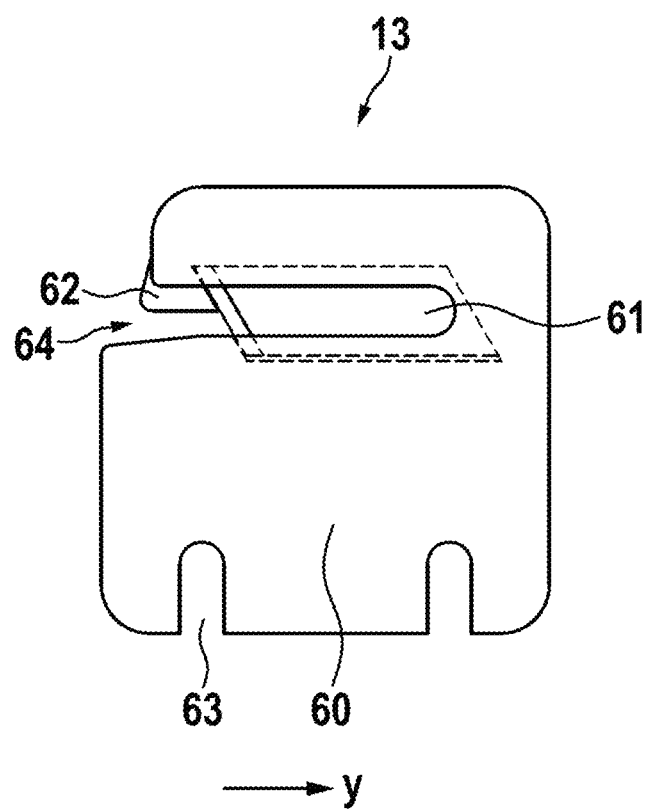
FIG. 6 shows a cutter in detail.

In FIG. 6, a preferred embodiment of a cutter is shown in detail. The cutter has a solid base plate 60, which holds a knife 61. The knife may comprise several cutting sections. Preferably, the knife 61 is clamped, glued, welded, or soldered to the cutter base plate. The cutter base plate forms a cutting slot 64 through which the belt of balancing weights in inserted for cutting into the direction indicated as x. It is preferred if this slot is wide enough for inserting the belt of balancing weights. On the other hand, it should be comparatively narrow to prevent a finger or other body part of the operator from being cut by the knife and therefore prevents injuries. It is further preferred if there is a guide 62 at the cutting slot, guiding the belt of balancing weights, such that the belt of balancing weights is cut between two adjacent balancing weights. In this embodiment, the guide 62 simply limits the height of the cutting slot and does not allow inserting of the belt of balancing weights at the position of a balancing weight into the cutting slot. Instead, the height-limited cutting slot is wide enough for inserting the belt of balancing weights at a position between two adjacent balancing weight bodies. Furthermore, it is preferred if the guide 62 slightly separates two adjacent balancing weight bodies to simplify cutting. Preferably, a cutter is a simple module which may be attached by at least one mounting slot or hole 63 to a balancing weight dispenser. Most preferably, the cutter has no user replaceable parts. Therefore, it should not be possible to replace the knife by a user. Instead, the cutter is exchanged as a whole part. Due to its symmetric mounting slots, the cutter may be mounted in different directions to allow inserting of the balancing weight string from two opposite sides along the y-axis or opposing thereto. This is specifically useful in an embodiment as shown in FIG. 4 with two closely mounted dispensers. Here, the string may be inserted into cutter 13 in the y-direction, whereas the string may be inserted into cutter 23 in a direction opposite to the y-direction.

Figure 7:
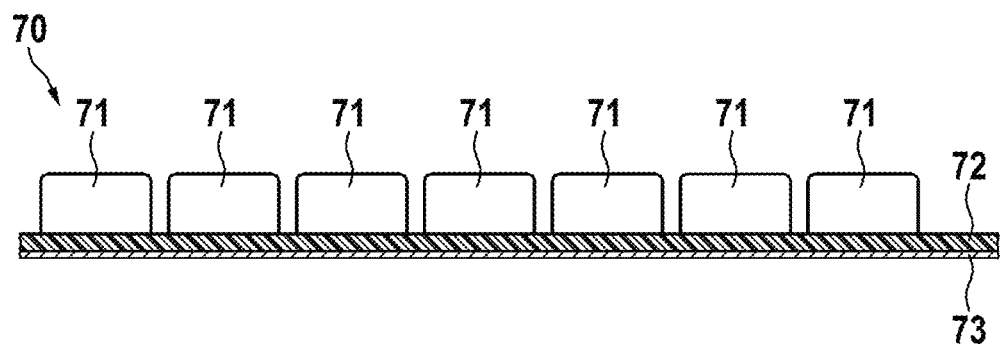
FIG. 7 shows a belt of balancing weights in a first embodiment.

In FIG. 7, a belt of balancing weights 70 in a first embodiment is shown. The belt of balancing weights 70 comprises a plurality of balancing weight bodies 71, which are positioned on a self-adhesive tape 72. The side of the self-adhesive tape 72, which is opposite to the balancing weight bodies 71, is protected by a liner 73.

Figure 8:
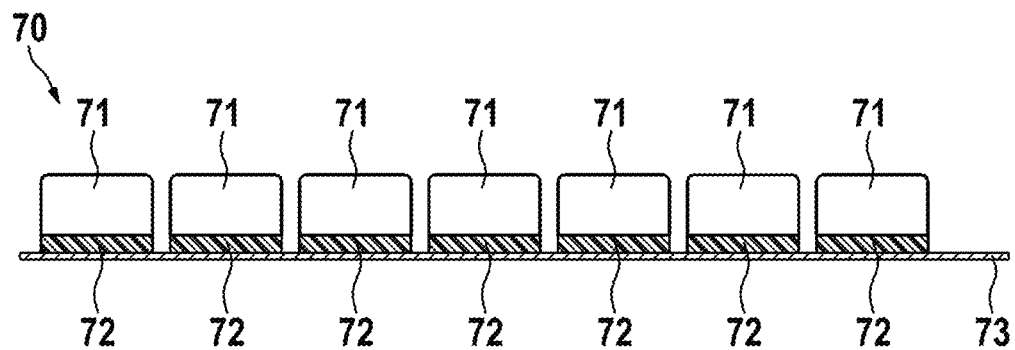
FIG. 8 shows another embodiment of a belt of balancing weights.

In FIG. 8, another embodiment of a belt of balancing weights is shown. Here, each balancing weight body 71 has a segment of self-adhesive tape 72. There is only a common liner 73 to protect the self-adhesive tape and to form a belt of balancing weights by holding the balancing weights and their self-adhesive tapes together. In this embodiment, it is no more necessary to cut the self-adhesive tape, which sometimes can be difficult due to the adhesive properties. Instead, only the non-adhesive liner has to be cut.

Figure 9:
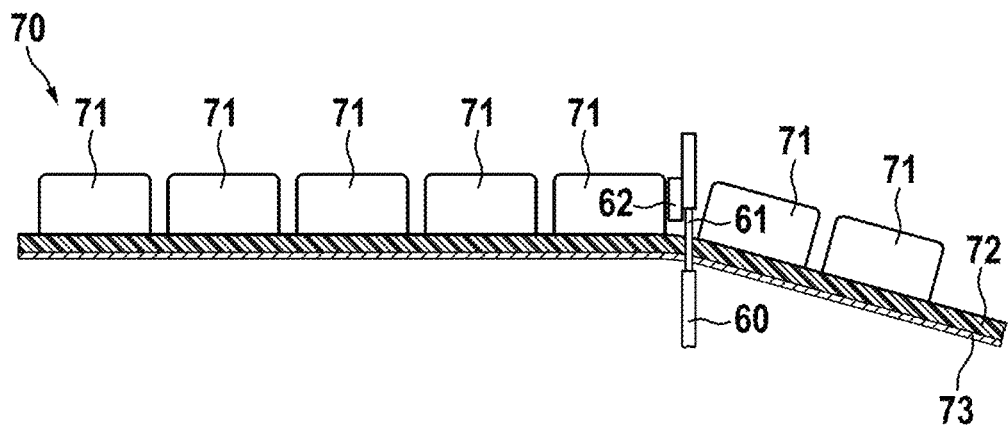
FIG. 9 shows the cutting process in detail.

In FIG. 9, a process of cutting the belt of balancing weights is shown in detail. Here, the knife 60 penetrates in-between two balancing weight bodies 71 and cuts the self-adhesive tape 72 together with the liner 73.

Figure 10:
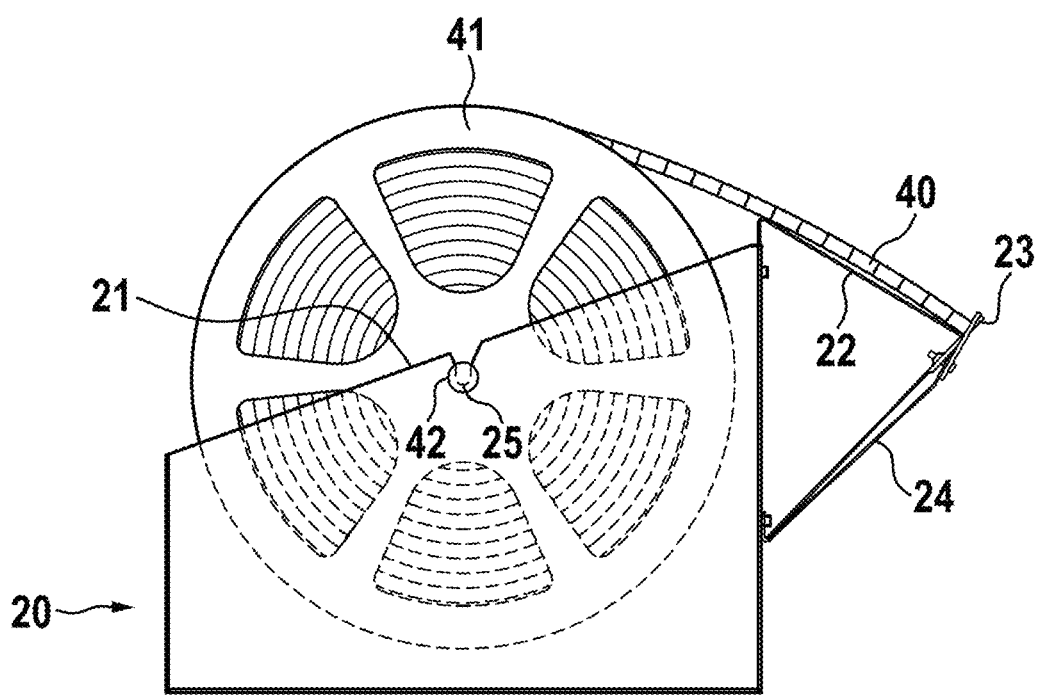
FIG. 10 shows a modified embodiment.

FIG. 10 shows a modified embodiment with a modified reel holder 21.

Figure 11:
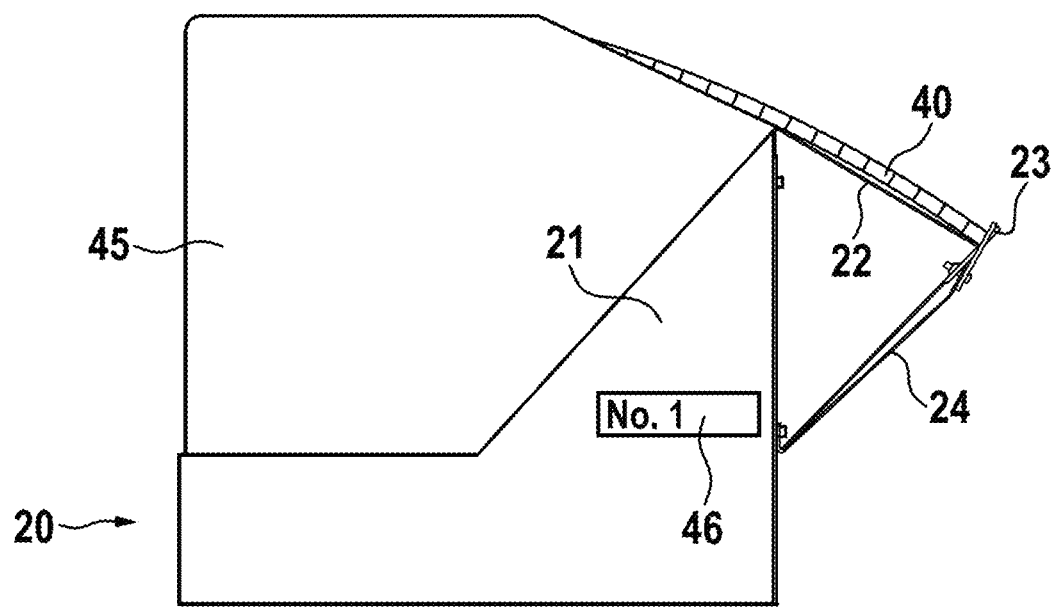
FIG. 11 shows another embodiment.

FIG. 11 shows another embodiment with a box 45 holding the string of balancing weights. The box may have an internal reel, although this is not required. There may be cut out in the reel holder 21 showing a marking 46 of the box, which may indicate the type of balancing weights in the box or give any other useful information.

It will be appreciated to those skilled in the art having the benefit of this disclosure that this invention is believed to provide a manually operated dispensing device for balancing weights, preferably for balancing weights for vehicle wheels. Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

LIST OF REFERENCE NUMERALS 10 first balancing weight dispenser
11 reel holder
12 belt guide
13 cutter
14 support
15 pivot guide slot
16 mounting slot
17 recess
18 balancing weight storage space
20 second balancing weight dispenser
21 reel holder
22 belt guide
23 cutter
24 support
25 pivot guide slot
26 mounting slot
27 recess
28 balancing weight storage space
30 container
40 belt of balancing weights
41 reel
42 pivot
45 box
46 marking
50 stand
51 base
52 body
53 lower section
54 upper section
55 opening
56 holes
60 cutter base plate
61 knife
62 guide 63 mounting slot
70 belt of balancing weights
71 balancing weight bodies
72 self-adhesive tape
73 liner
x direction for pulling balancing weights from reel or stack
y direction for cutting

The invention claimed is:

1. Balancing weight dispenser comprising:
   a dispenser body having a base and defining a balancing weight storage space within the base, the balancing weight storage space configured to store a belt of balancing weights;
   a belt guide coupled in fixed relation to the dispenser body and configured to support a portion of the belt of balancing weights from below along a longitudinal direction of movement as the portion of the belt of balancing weights extends from the balancing weight storage space, and
   a cutter comprising a cutter body and a knife and coupled to the dispenser body, the cutter body defines a slot and is configured to hold the knife in a fixed relation to the cutter body such that a cutting edge of the knife is exposed in the slot,
   where the cutter further comprises a cutter guide that is offset from a cutting plane defined by the knife,
   where a position of the cutter is static in relation to the belt guide, and
   where the cutter is positioned such that the longitudinal direction of movement extends toward and/or through the cutter.

2. Balancing weight dispenser according to claim 1, wherein the dispenser body is configured to store the belt of balancing weights on a reel.

3. Balancing weight dispenser according to claim 1, wherein the cutter body comprises a solid cutter body.

4. Balancing weight dispenser according to claim 1, wherein:
   the cutter guide is coupled to the cutter body and is positioned between the knife and the belt guide,
   a surface of the cutter guide is configured to, during a cutting operation of the belt of balancing weights, contact a surface of a weight and guide the belt of balancing weights toward the knife such that the knife separates the belt of balancing weights at a position between two adjacent balancing weights, the surface of the cutter guide offset from a cutting plane defined by the knife.

5. Balancing weight dispenser according to claim 1, wherein the cutter is configured to receive the belt of balancing weights sideways at an angle of 90° to the longitudinal direction of movement of the belt of balancing weights.

6. Balancing weight dispenser according to claim 1, further comprising:
   the belt of balancing weights, where the belt of balancing weights comprises:
      a plurality of individual balancing weight bodies having individual pieces of self-adhesive tape; and
      a common liner coupled to adhesive surfaces of the self-adhesive tape such that the liner holds the balancing weights in a row along a length of the liner to form a belt.

7. Belt of balancing weights for a balancing weight dispenser according to claim 1, the belt of balancing weights comprising:
   a plurality of individual balancing weight bodies having individual pieces of self-adhesive tape; and
   a common liner coupled to the individual pieces of self-adhesive tape such that the liner holds the balancing weights in a row along a length of the liner to form a belt.

8. Balancing weight dispenser according to claim 1, further comprising:
   a support member coupled to the dispenser body and to the belt guide,
   where the cutter is coupled to and in contact with the support member.

9. Balancing weight dispenser according to claim 1, wherein the cutter is removably coupled to the dispenser body.

10. Balancing weight dispenser according to claim 1, wherein an opening of the slot is configured to receive a portion of the belt of balancing weights between a pair of adjacent balancing weights, and the cutting edge of the knife faces the opening of the slot.

11. Balancing weight dispenser according to claim 1, wherein the base configured to contact a horizontal surface to support the dispenser body in a fixed orientation.

12. Balancing weight dispenser according to claim 11, wherein the belt guide is configured to support the portion of the belt of balancing weights from below along the longitudinal direction of movement when the dispenser body is supported by the base on the horizontal surface.

13. Balancing weight dispenser according to claim 1, wherein:
   the cutter body includes a first wall and a second wall defining a slot in which the first wall is opposite the second wall,
   the slot having an opening, an end, and a slot channel between the opening and the end,
   the cutting edge of the knife spans across the slot channel between the first wall and the second wall, and
   the cutter guide is configured to restrict access to the opening of the slot.

14. Balancing weight dispenser comprising:
   a dispenser body having a base and defining a balancing weight storage space within the base, the balancing weight storage space configured to store a belt of balancing weights;
   a belt guide coupled in fixed relation to the dispenser body and having an upper surface configured to support a portion of the belt of balancing weights from below along a longitudinal direction of movement as the portion of the belt of balancing weights extends from the balancing weight storage space, a plane defined by a surface of the belt guide extends along the longitudinal direction of movement; and
   a cutter comprising a cutter body and a knife and coupled to the dispenser body, the cutter body defines a slot and is configured to hold the knife in a fixed relation to the cutter body such that a cutting edge of the knife is exposed in the slot;
   where the cutter further comprises a cutter guide that is offset from a cutting plane defined by the knife,
   where a position of the knife is static in relation to the belt guide such that the cutting edge of the knife faces a lateral direction that extends across the longitudinal direction of movement; and
   where the cutter is positioned such that the longitudinal direction of movement extends toward and/or through the cutter.

15. Balancing weight dispenser according to claim 14, wherein the dispenser body is configured to store the belt of balancing weights on a reel having an axis of rotation, and wherein a length of the slot is parallel to the axis of rotation of the reel.

16. Balancing weight dispenser according to claim 14, wherein the cutter body comprises a solid cutter body holding the knife, wherein the slot is configured to receive the belt of balancing weights via an opening of the slot, and wherein the cutting edge of the knife faces the opening of the slot.

17. Balancing weight dispenser according to claim 14, wherein:
the cutter guide is coupled to the cutter body and configured to guide the belt of balancing weights toward the knife such that the knife separates the belt of balancing weights at a position between two adjacent balancing weights, and
the cutting plane is perpendicular to the longitudinal direction of movement, and the cutting edge of the knife lies on the cutting plane.

18. Balancing weight dispenser according to claim 14, wherein the cutter is configured to receive the belt of balancing weights sideways at an angle of 90° to the longitudinal direction of movement of the belt of balancing weights.

19. Balancing weight dispenser according to claim 14, further comprising:
the belt of balancing weights, where the belt of balancing weights comprises:
a plurality of individual balancing weight bodies having individual pieces of self-adhesive tape; and
a common liner coupled to adhesive surfaces of the self-adhesive tape such that the liner holds the balancing weights in a row along a length of the liner to form a belt.

20. Belt of balancing weights for a balancing weight dispenser according to claim 14, the belt of balancing weights comprising:
a plurality of individual balancing weight bodies having individual pieces of self-adhesive tape; and
a common liner coupled to the individual pieces of self-adhesive tape such that the liner holds the balancing weights in a row along a length of the liner to form a belt.

21. Balancing weight dispenser according to claim 14, further comprising:
a support member coupled to the dispenser body and to the belt guide,
where the cutter is coupled to and in contact with the support member.

22. Balancing weight dispenser according to claim 14, wherein the cutter is removably coupled to the dispenser body.

\* \* \* \* \*